(12) United States Patent
Eggersmann

(10) Patent No.: US 11,753,352 B2
(45) Date of Patent: Sep. 12, 2023

(54) AEROBIC METHOD AND DEVICE FOR TREATING ORGANIC MATERIAL

(71) Applicant: Kompoferm GmbH, Marienfeld (DE)

(72) Inventor: Karlgünter Eggersmann, Marienfeld (DE)

(73) Assignee: Kompoferm GmbH, Marienfeld (DE)

( * ) Notice: Subject to any disclaimer, the term of this patent is extended or adjusted under 35 U.S.C. 154(b) by 91 days.

(21) Appl. No.: 16/488,790

(22) PCT Filed: Sep. 1, 2017

(86) PCT No.: PCT/EP2017/072028
§ 371 (c)(1),
(2) Date: Aug. 26, 2019

(87) PCT Pub. No.: WO2019/042569
PCT Pub. Date: Mar. 7, 2019

(65) Prior Publication Data
US 2021/0214284 A1 Jul. 15, 2021

(51) Int. Cl.
*C05F 17/943* (2020.01)
*C05F 17/80* (2020.01)
(Continued)

(52) U.S. Cl.
CPC ............ *C05F 17/943* (2020.01); *C05F 17/80* (2020.01); *C05F 17/979* (2020.01); *C05F 17/986* (2020.01)

(58) Field of Classification Search
CPC ...... C05F 17/943; C05F 17/986; C05F 17/80; C05F 17/979; C05F 17/964; C05F 17/939; Y02P 20/145; Y02W 30/40
See application file for complete search history.

(56) References Cited

U.S. PATENT DOCUMENTS

| 5,204,263 A | 4/1993 | Finn |
| 2008/0064087 A1 | 3/2008 | O'Neil |
| 2009/0029448 A1 | 1/2009 | Allain |

FOREIGN PATENT DOCUMENTS

| JP | S56-62596 A | * | 5/1981 | |
| JP | 56-89899 | * | 7/1981 | .............. C05F 11/02 |

(Continued)

OTHER PUBLICATIONS

Chastain, JP. "Covers: A Method to Reduce Odor from Manure Storages". Clemson Extension. Agricultural & Natural Resource Engineering Applications ANREA—081 (Feb. 2008) (Year: 2008).*

(Continued)

*Primary Examiner* — Jennifer A Smith
(74) *Attorney, Agent, or Firm* — Laurence P. Colton; SMITH TEMPEL BLAHA LLC

(57) ABSTRACT

An aerobic method for treating organic material, having the steps of loading a treatment unit with organic material; covering the organic material with a first membrane; aerobic treatment of the organic material by actively supplying air to the organic material and the supplied air flowing through said organic material; turning over the organic material using a turning-over device, wherein the organic material is homogenized and/or mixed; and continuing the supply of air according to step c). The turning-over device is moved along the direction of longitudinal extent of the treatment unit, turning over the organic material by a turning-over roller. The turning-over device has a membrane holding apparatus which holds the first membrane covering the organic material during the turning over, and a membrane laying apparatus, which lays a second membrane on the turned-over organic material.

12 Claims, 9 Drawing Sheets

(51) Int. Cl.
    *C05F 17/986*     (2020.01)
    *C05F 17/979*     (2020.01)

(56) References Cited

FOREIGN PATENT DOCUMENTS

| | | |
|---|---|---|
| JP | 08257539 A * | 10/1996 |
| WO | 2016174513 A1 | 11/2016 |

OTHER PUBLICATIONS

The Plastic Sheeting Gurus. "Is Polyethylene Sheeting Plastic Sheeting?" Global Plastic Sheeting <https://www.globalplasticsheeting.com/our-blog-resource-library/is-polyethylene-sheeting-plastic-sheeting> Nov. 5, 2018 (Year: 2018).*
Lexico. "membrane" Powered by Oxford <https://www.lexico.com/definition/membrane> Jun. 15, 2021 (Year: 2021).*
WIPO, International Search Report (on priority application), dated May 22, 2018.

* cited by examiner

AEROBIC METHOD AND DEVICE FOR TREATING ORGANIC MATERIAL

CROSS REFERENCE TO RELATED APPLICATIONS

This application is the US National Phase of and claims the benefit of and priority on International Application No. PCT/EP2017/072028 having a filing date of 1 Sep. 2017.

BACKGROUND OF THE INVENTION

Technical Field

The invention concerns an aerobic method for treating organic material and a corresponding device for treating organic material having at least one turning-over device with a turning-over roller and a membrane holding apparatus on a first side of the turning-over device and a membrane laying apparatus on a second side of the turning-over device opposite to the first side, which has a moisture-permeable and/or air-permeable but at least odor-reducing second membrane and/or first membrane.

Prior Art

In generic methods, organic material is usually placed in a treatment unit (usually with a wheel loader) where it is dried or composted under air supply. Organic material is a material which has at least organic material but which may also contain non-organic material. In such processes, it is necessary to occasionally turn over or transfer the material so that material mixing takes place, lumps break up and generally the material is homogenized. During this operation, the material is exposed, i.e., over the entire length of the treatment unit, an exchange with the air can take place. This results in non-insignificant odor impairments, which are perceived as unpleasant and disturbing for the immediate surroundings of such treatment facilities. Since such turning over operations are usually carried out with wheel loaders and corresponding treatment units usually have a certain length (some 10 m), the turning over operation from one treatment unit to another usually takes several hours. During this time, the organic material is exposed, i.e., a constant exchange of odors with the ambient air (and thereby strong olfactory pollution) cannot be prevented during this time.

BRIEF SUMMARY OF THE INVENTION

The object of the present invention is therefore to indicate a method and a device of the type mentioned above which significantly reduces olfactory pollution, i.e., the emission of odors from the process or as a result of turning over of the material.

This object is solved by an aerobic method for treating organic material in which the following steps are carried out:
a. loading a treatment unit with organic material to be treated;
b. covering the organic material to be treated with a moisture- and/or air-permeable, but at least odor emission-reducing first membrane;
c. aerobic treatment of the organic material by actively supplying air to the organic material and the supplied air flowing through said organic material;
d. turning over the organic material using a turning-over device, wherein the organic material is homogenized and/or mixed, wherein optionally the active supply of air to the organic material is interrupted and/or reduced during the turning over operation; and
e. continuing the supply of air according to step c, characterized in that a turning-over device is used for the turning over, which is moved along the direction of longitudinal extent (X) of the treatment unit and thereby turns over the organic material by means of a turning-over roller, wherein the turning-over device has a membrane holding apparatus, which holds the first membrane covering the organic material during the conversion and wherein the turning-over device has a membrane laying apparatus which lays a moisture-permeable and/or air-permeable but at least odor emission-reducing second membrane on the turned-over organic material.

The object is solved by a device for treating organic material, in particular for carrying out a method according to the invention, having at least one turning-over device with a turning-over roller and a membrane holding apparatus on a first side of the turning-over device and a membrane laying apparatus on a second side of the turning-over device opposite to the first side, which has a moisture-permeable and/or air-permeable but at least odor-reducing second membrane and/or first membrane.

For example, an aerobic method for treating organic material according to the invention, comprises the following steps:
a. loading a treatment unit with organic material to be treated;
b. covering the organic material to be treated with a moisture- and/or air-permeable, but at least odor emission-reducing, first membrane;
c. aerobic treating of the organic material by actively supplying air to the organic material and flowing through thereof with the supplied air;
d. transferring the organic material using a turning-over device (2), wherein the organic material is homogenized and/or mixed, wherein optionally the active supply of air to the organic material is interrupted and/or reduced during the turning over operation; and
e. continuing the supply of air according to step c.

For the turning over, a turning-over device is used, which is moved along the direction of longitudinal extent of the treatment unit. During this operation, the turning-over device turns the organic material by means of a turning-over roller. The turning-over device has a membrane-holding apparatus which holds the first membrane covering the organic material during the turning over. The turning-over device further has a membrane-laying apparatus which lays a second membrane, which lays a moisture- and/or air-permeable, but at least odor emissions-reducing, second membrane on the turned-over organic material.

The core idea of the present invention is to use a turning-over roller instead of a wheel loader, which is not only capable of turning over the entire material of a treatment unit in a relatively short time compared to a wheel loader but is additionally equipped with a membrane-holding device and a membrane laying apparatus. In this way, the organic material to be treated can also be covered during the turning-over operation to the outside to prevent odors, so that odor emissions are also reduced or prevented during the turning-over operation. In the process, a membrane already located on the organic material is lifted off by the membrane-holding device, a further membrane is immediately placed on the organic material by means of a membrane-laying apparatus. In this way, the turning-over process takes place largely under an odor emission-reducing membrane, so that the release of high odor emissions is limited to a narrow area behind the turner.

According to a preferred embodiment it is provided that the first membrane is to be wound up during the turning over by the membrane-holding apparatus arranged on the turning-over device on the side advancing in the direction of movement. The winding up makes it particularly easy to lift the membrane from the organic material during the advance of the turning-over device.

Correspondingly, according to a further embodiment of the present invention, it may alternatively or additionally be provided that the second membrane is unwound during the turning over by the membrane laying apparatus arranged on the turning-over device on the side following in the direction of movement. In this way, it is just as easy as when receiving the membrane to place again another membrane of the same or a different structure on the organic material while the turning-over operation is running.

The method according to the invention may preferably be a method in which the organic material is dried and/or composted aerobically, hygienized and/or aerobized, and/or substances, especially pollutants, are microbiologically converted and/or degraded.

After a further variant of the method according to the invention, it can be provided that already during step b. a turning over of the organic material is carried out by means of the turning-over device. In this way, the organic material, which is in extreme cases usually very inhomogeneous when the treatment unit is loaded, is homogenized once by turning over before the start of the treatment process. This can optimize or accelerate the treatment process as a whole.

As a further variant, alternatively or in addition to this, it can be provided that after completion of the aerobic treatment operation a further turning over of the organic material takes place by means of the turning-over device. Here, the membrane lying on the organic material is taken up by the membrane-holding apparatus. In this way, the finished treated material is homogenized again and prepared for removal, wherein the cover (membrane) is removed at the same time so that the removal of the material can take place immediately.

As mentioned above, the invention also concerns a device for carrying out the above-mentioned method.

The device has the following:
At least one turning-over device with a turning-over roller and a membrane-holding apparatus on a first side of the turning-over device and a membrane-laying apparatus on a second side opposite to one of the first sides of the turning-over device, which has a moisture- and/or air-permeable but at least odor emissions-reducing second membrane and/or first membrane. Compared to a wheel loader, this turning-over device has the advantage that the turning roller, which is guided along the main direction of longitudinal extent of the treatment unit within the treatment unit in one direction of movement of the turner, can be structured in such a way that it throws material located at the edge to the middle, so that a good mixing of the organic material already takes place during the turning-over operation.

It is preferably provided that the device according to the invention comprises at least one treatment unit with a storage tray for laying organic material, wherein the treatment unit further comprises a ventilation apparatus, preferably arranged in the storage tray, which can ventilate organic material laid on the storage tray. This device can also be used to aerobically treat the organic material, wherein the ventilation apparatus is capable of flowing air through the organic material from below. The ventilation apparatus can also be designed in such a way that it can collect and drain liquids that are generated or released in the treatment unit.

Advantageously it is provided that the treatment unit has at least two spaced side walls extending in the main longitudinal extension of the treatment unit. On the one hand, the side walls have the advantage that the organic material is held securely within the treatment unit during the turning-over operation. On the other hand, the membrane can be placed over the side walls and, if necessary, fastened to the side walls, which results in a considerably better sealing of the entire device to the outside. In particular, it can also be used to treat non-stackable material. According to the invention, a device can, of course, have several treatment units, which in turn can have corresponding side walls.

In the case of a treatment unit with side walls, it may be preferred that the turning-over roller of the turning-over device extends over the entire width of the treatment unit between the side walls. The turning-over roller can, therefore, turn over the entire interior of the treatment unit without being affected by a chassis or the like. A special embodiment of the present invention provides that the turning-over device has a chassis which can move the turning-over device in a direction of movement parallel to the side walls and which is arranged on the respective outer sides of the side walls, in particular, adjacent to the outer sides. The chassis is not connected to the outside of the side walls and is only supported by the floor.

For turning over, it is usually intended that the turning-over device is guided through the treatment unit in one direction of movement or working direction. The turning-over device can also be designed in such a way that it can be guided bi-directionally through a treatment unit without having to turn the device by 180°. On the one hand, this has the advantage that the turning-over device has two working directions and does not have to be turned. On the other hand, in facilities with several treatment units, the turning-over device can be moved out of one treatment unit and back into the next adjacent treatment unit after the turning over has taken place, wherein the turning over there then takes place in the corresponding opposite direction.

Consequently, according to a special embodiment of the device according to the invention, it is provided that it has two turning-over rollers arranged one behind the other in the direction of movement, with opposite directions of rotation. The two turning-over rollers can be lowered and raised. This can be done, for example, by mounting both turning-over rollers on a rocker arm which can be operated via a rotary drive. Other possibilities are that the holders of the turning-over rollers can be moved vertically compared to the turning-over device via corresponding linear drives.

For bi-directional operation, it may also be possible in particular for the turning-over device to have a rotatable driver's cab, in particular by approx. 180°. Alternatively, it would also be possible to arrange the driver's seat direction of the driver's cab at an angle of approximately 90° to the direction of movement of the turner. The driver's seat may then, if necessary, be rotatable within a certain angular range within the cab so that the driver can orientate himself in the current direction of movement.

The device according to the invention can be designed in such a way that it can be moved or operated in two working directions. In particular, the chassis can be designed in such a way that it can be driven in two opposing directions. Furthermore, a turning-over roller can be designed in such a way that it functions in two directions of rotation, e.g. by allowing blades located on the turning-over roller to be moved, e.g. rotated.

BRIEF DESCRIPTION OF THE DRAWINGS

The invention will be explained in more detail in the following embodiments, which are represented in FIGS. 1-9.

DETAILED DESCRIPTION OF PREFERRED EMBODIMENTS

Figure 1:
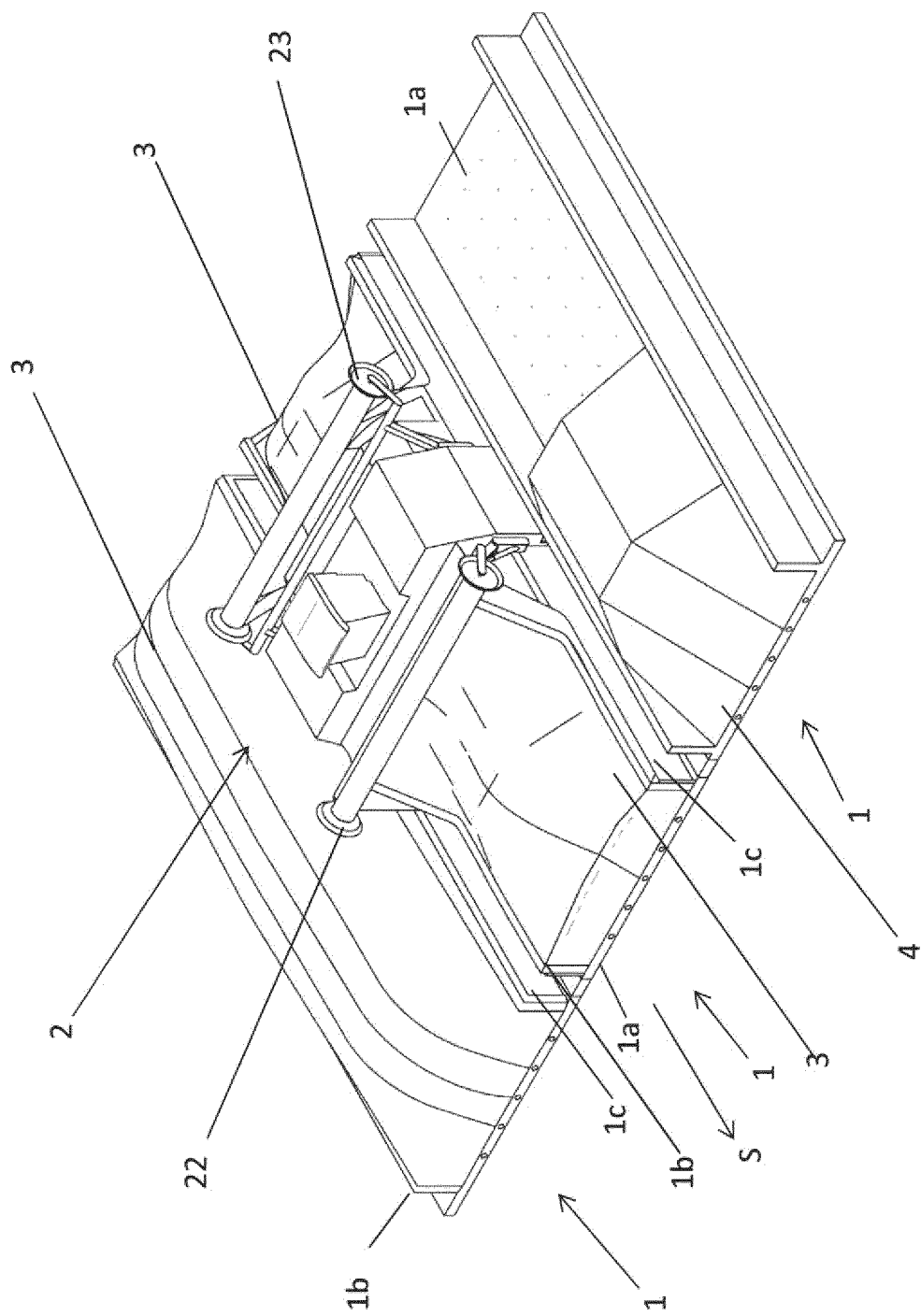
FIG. 1 shows a possible device according to the invention in perspective view.
Figure 2:
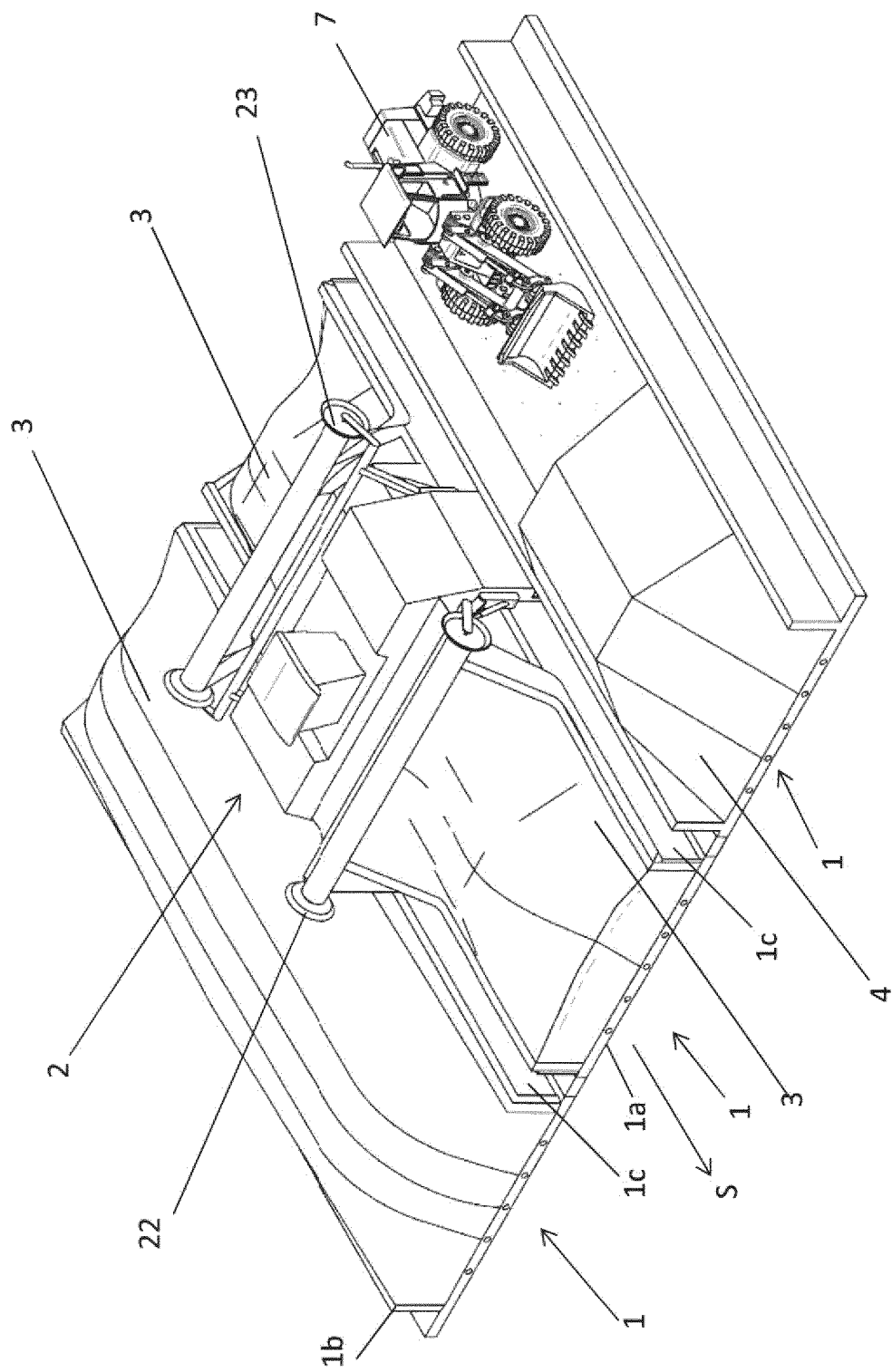
FIG. 2 also shows the device according to the invention in perspective view.

FIG. 1 shows a device according to the invention. This can be part of a treatment facility. In this case, several adjacent treatment units 1 are provided. Each of the treatment units may have side walls 1b and 1c extending along its main longitudinal extent. The treatment units 1 also have an appropriate bottom 1a in addition to the aerobic treatment of organic material 4, which can be supplied with air via pipes, which then flow through openings in the bottom 1a into or through the organic material 4 and through which liquid can be absorbed and discharged. The three illustrated treatment units 1 show in one case organic material covered with a membrane 3 (left most unit). In the middle treatment unit 1 there is a turning-over device 2 according to the invention, which can be moved in the direction of movement S along the longitudinal extent of the treatment unit 1, wherein said turning device lifts off a membrane 3—moisture- and/or air-permeable but at least reducing odor emissions—by means of a membrane holding device 22 during turning over and lays a further membrane 3 of the same or different construction on the organic material by means of a membrane laying apparatus 23 following in the direction of movement. In the very right treatment unit 1, organic material 4 is piled up to form a storage clamp, which is in the operation of emptying or loading. This is indicated in FIG. 2 by the wheel loader 7, which either piles up fresh material 4 to a middle finished aerobically treated material (e.g. dried material or composted material) from the treatment unit 1.

Figure 3:
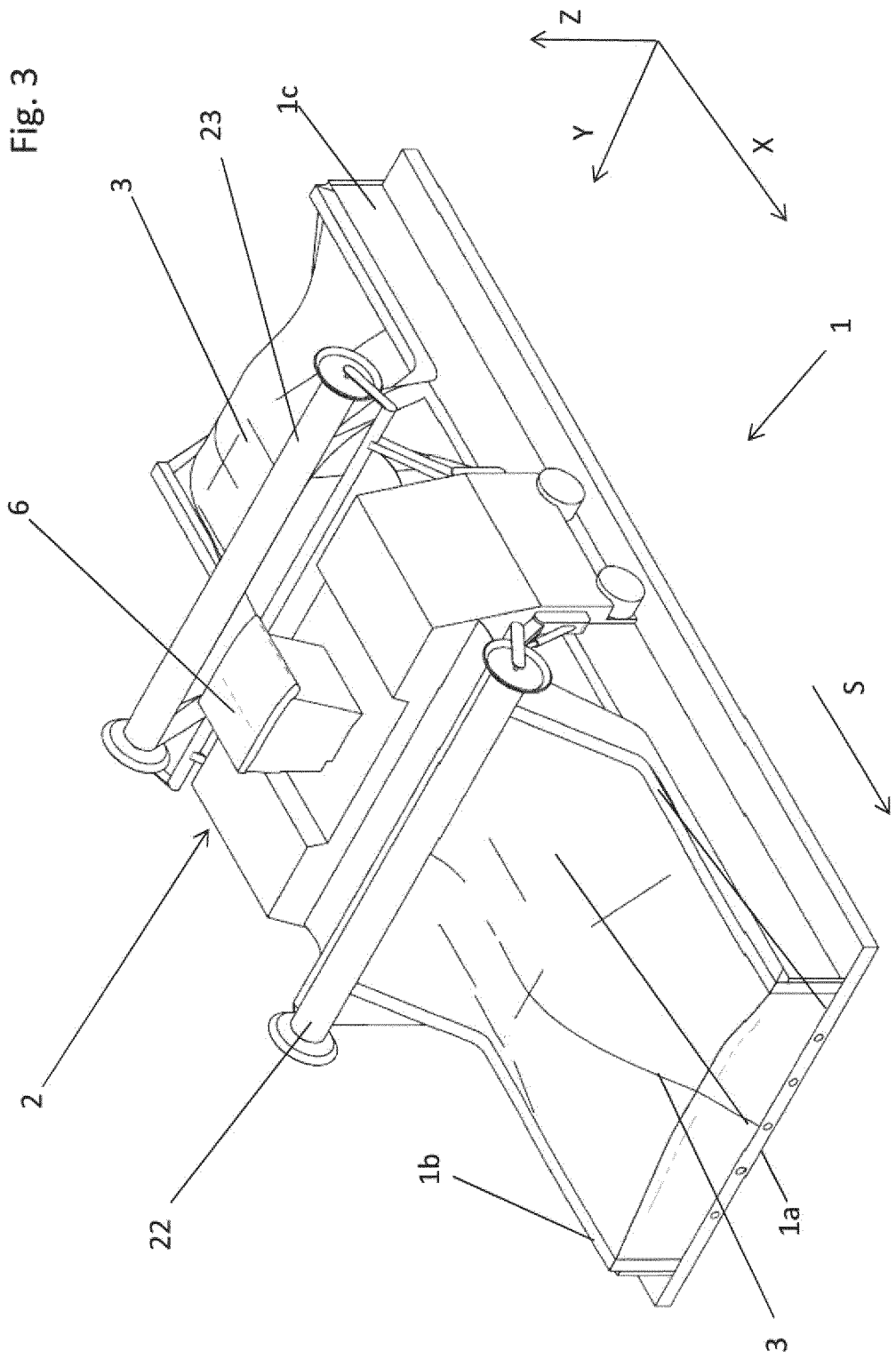
FIG. 3 shows an excerpt from the device according to the invention in the area of a treatment unit in perspective view.
Figure 4:
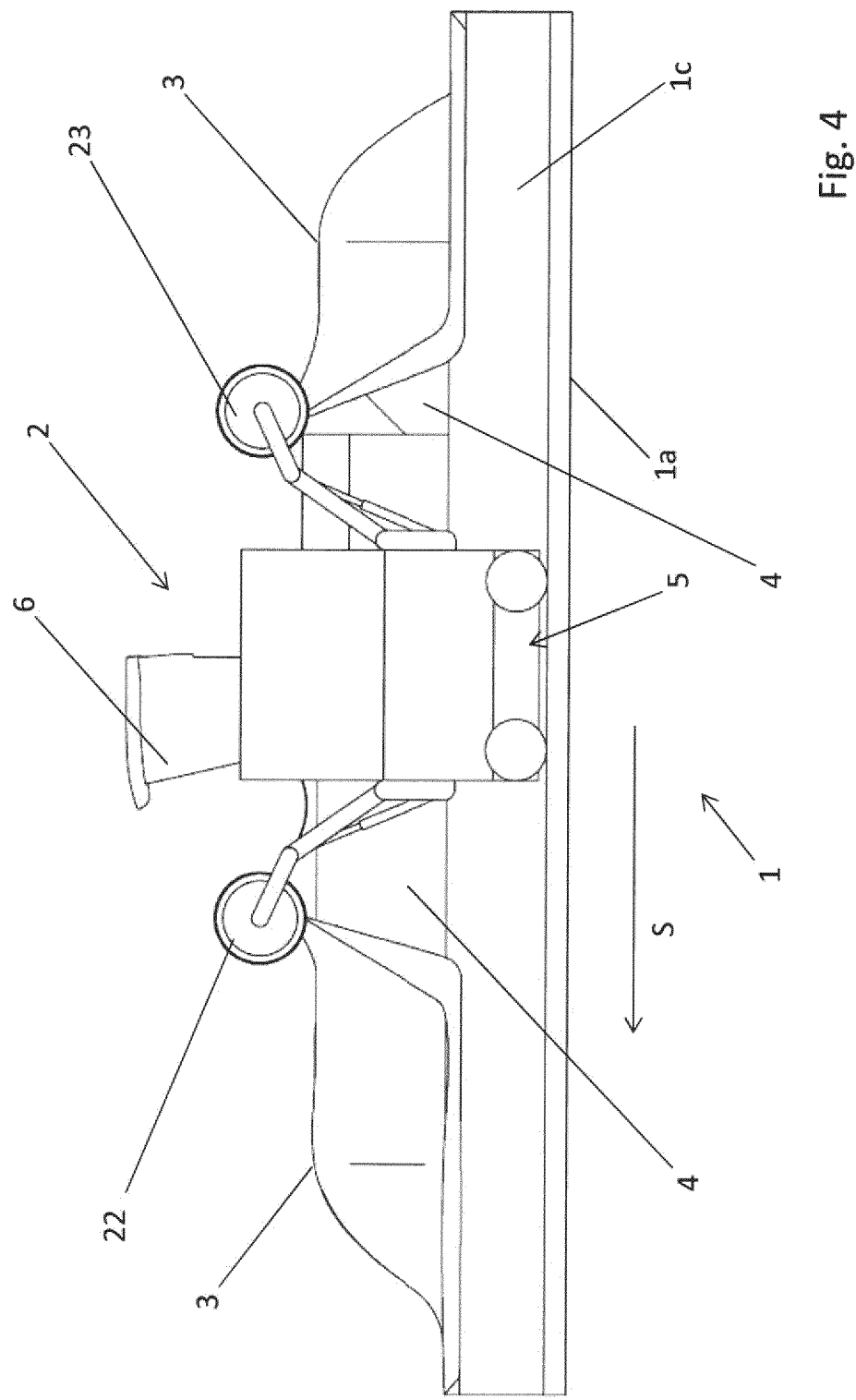
FIG. 4 shows a side view of the treatment unit shown in FIG. 3.
Figure 5:
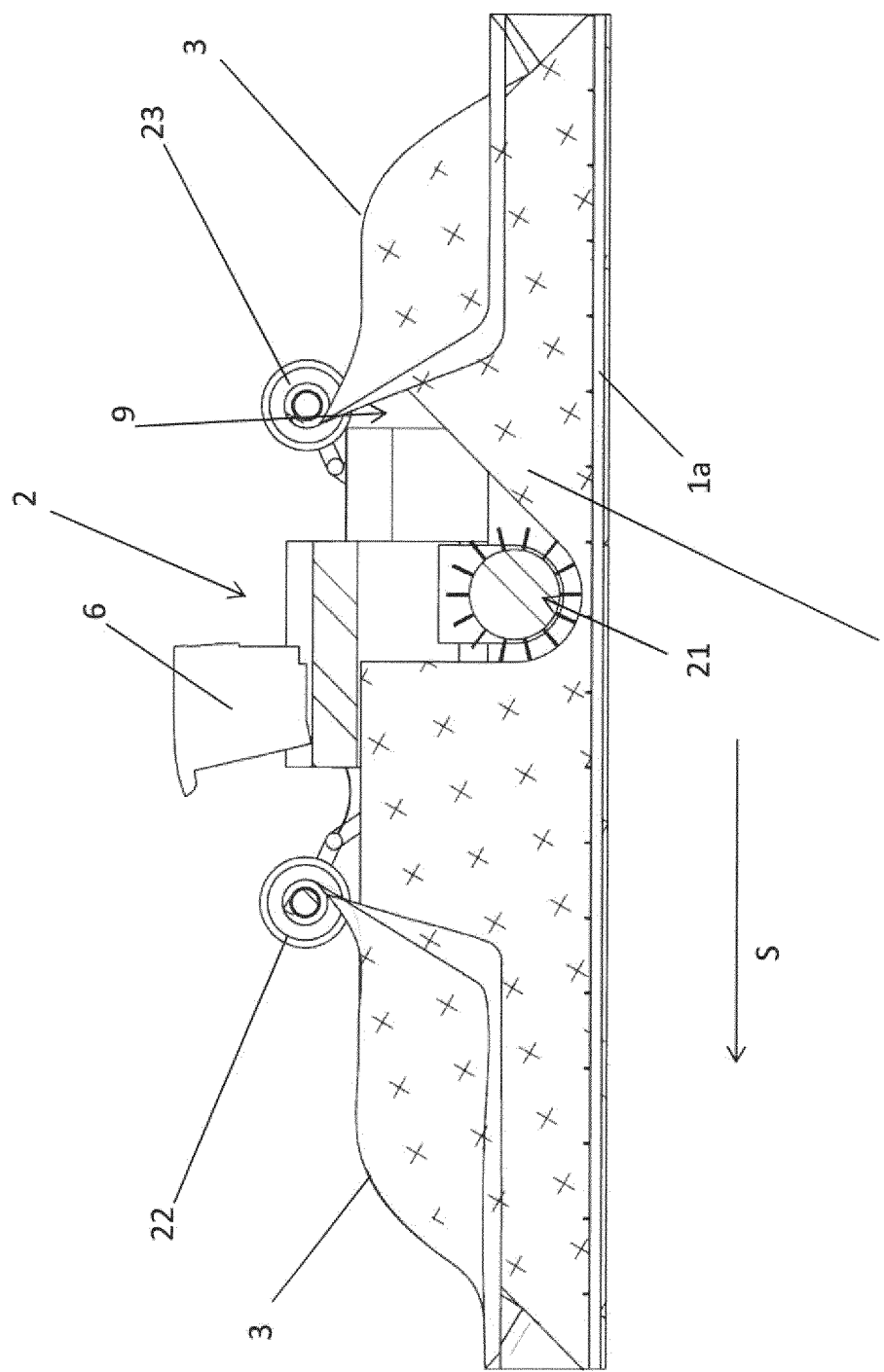
FIG. 5 shows a longitudinal view through the treatment unit shown in FIG. 3.

The turning-over process according to the invention shall now be explained in more detail by means of FIGS. 3 to 5. Y describes the cross direction of treatment unit 1. Z describes the vertical direction perpendicular to the bottom 1a and X describes the main longitudinal extension direction of treatment unit 1. As recognized in FIG. 3, the turning-over device 2 has a direction of movement S, the movement being in a working direction parallel to the main longitudinal extension direction X of treatment unit 1, with a winding shaft 22 on the leading side, which functions as a membrane holding apparatus, in that, when the turning-over device 2 is advanced in the direction of movement S, a membrane 3 is wound up by this winding shaft 22 and is held by the organic material located beneath it. On the side of the turning-over device 2 following in the direction of movement S is another winding shaft 23, which functions as a membrane laying apparatus by unwinding the membrane 3 from the winding shaft 23 during the turning over operation, i.e. when moving the turning-over device 2 in the direction of movement S and laying it on the organic material. When the turning-over device is moved through the treatment unit 1, by far the largest part of the organic material, therefore, remains underneath or covered by a membrane 3 during the entire turning-over operation.

As can be observed in particular from FIG. 5, only a small area 9 in the direction of movement S remains uncovered behind the turning-over device 2 or behind the turning-over roller. The exposed area of the organic material 4 is thus significantly reduced compared to the conventional technique with wheel loaders, in which a large part of the surface of the organic material is uncovered during the turning-over so that the odor emission is also reduced accordingly.

In this way, the odor emissions to the environment during the turning over are largely reduced or minimized. In the example shown, the driver's cab 6 of the turning-over device 2 can be arranged at an angle of 90° to the direction of movement S. In this way, the driver can overlook the working area both in the direction of movement and against the direction of movement. With a bi-directional drive mode of the turning-over device 2, it is also possible to look in both directions. Alternatively, it is of course also possible to rotate the driver's cab, especially by approx. 180°.

Figure 6:
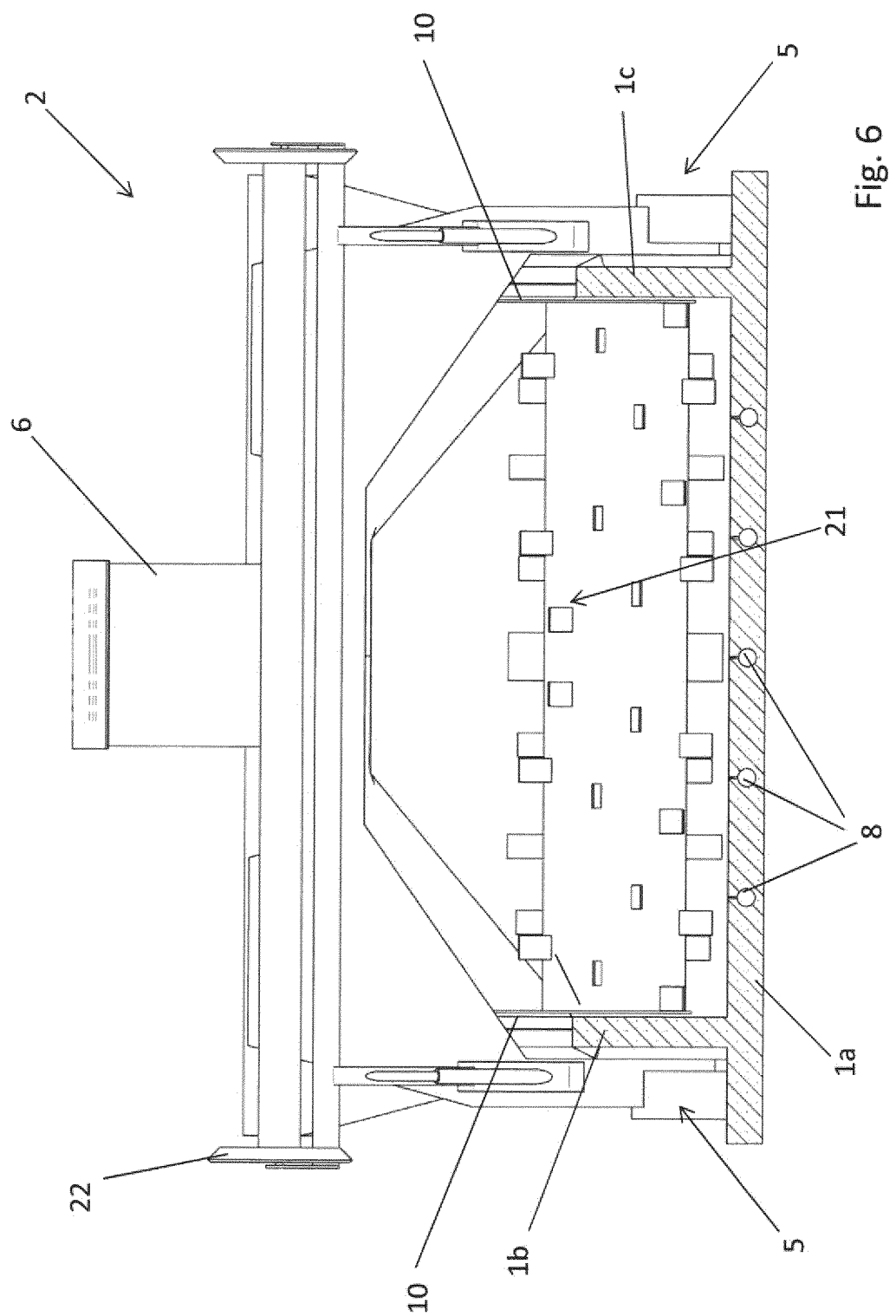
FIG. 6 shows a cross-section of the treatment unit shown in FIG. 3 in the area of the turning-over roller according to a first embodiment according to the invention.
Figure 7:
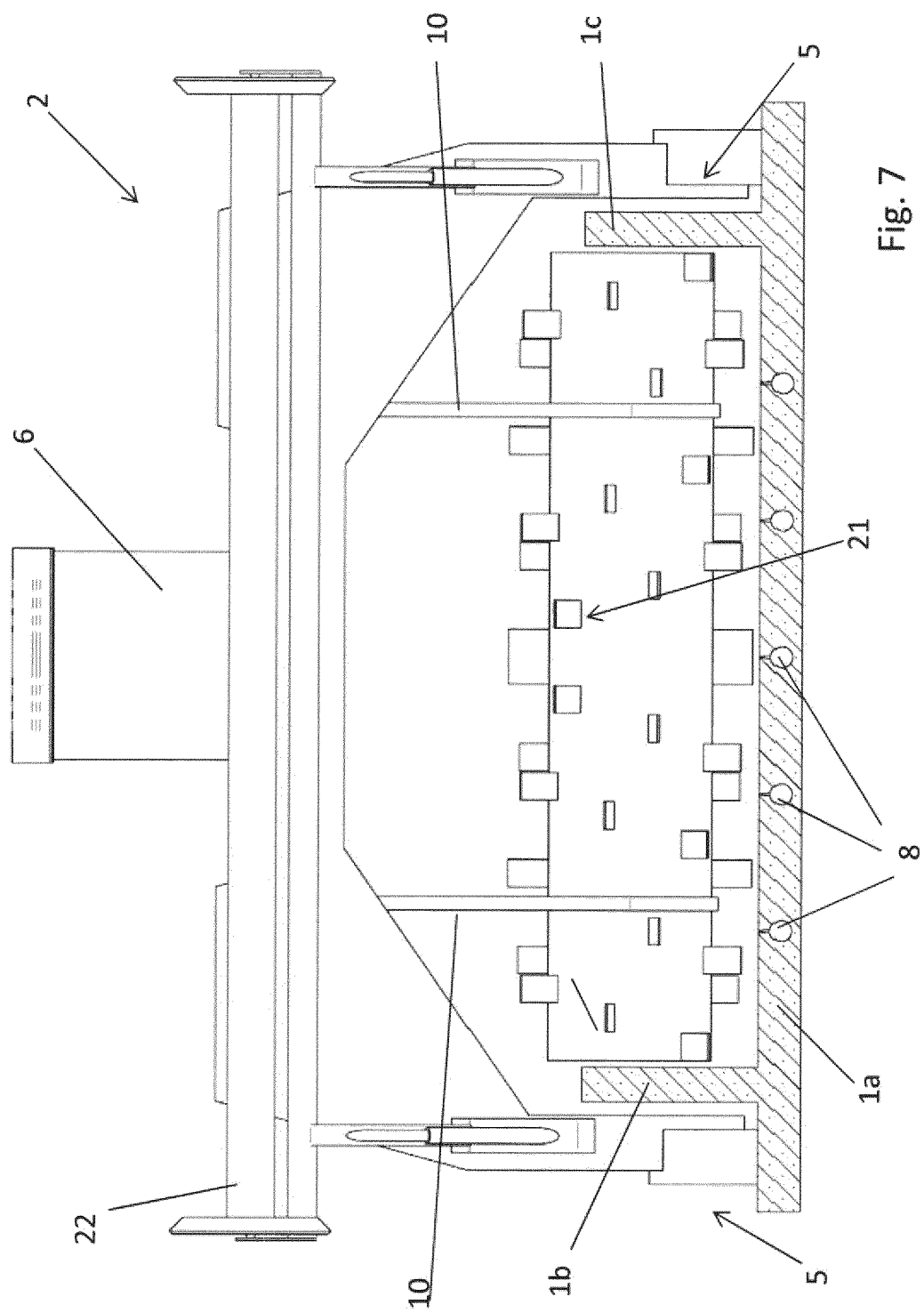
FIG. 7 shows a cross-section through the treatment unit shown in FIG. 3 in the area of the turning-over roller according to a second embodiment according to the invention.

The turning-over roller 21 may also be attached to the turning-over device 2 in various ways, as shown in the two cross-sections of FIGS. 6 and 7. In FIG. 6, the turning-over roller 21 is located between the side walls 1b and 1c of the treatment unit 1. The turning-over roller 21 extends over the entire inner area of the treatment unit. The bottom 1a of the treatment unit has ventilation pipes 8 which have small nozzle openings directed towards the interior of the treatment unit and through which the air flowing through the pipes 8 is blown into the organic material laid on the bottom 1a (not shown here) through which it can flow and through which liquid can be absorbed and discharged. In the example shown in FIG. 6, the turning-over roller 21 is mounted at its end faces on a carrier 10 which is connected to the frame of the turning-over device 2. The chassis 5 of the turning-over device 2 is located adjacent to the respective outer sides of the side walls 1b and 1c and is removed from the bottom 1a so that the turning-over device 2 can pass through the entire treatment unit without the chassis having to be guided through the treatment unit.

In the alternative shown in FIG. 7, the carriers 10 of the turning-over roller 21 are not arranged at its end faces, but further towards the middle of the treatment unit or the middle of the turning-over device 2.

Figure 8:
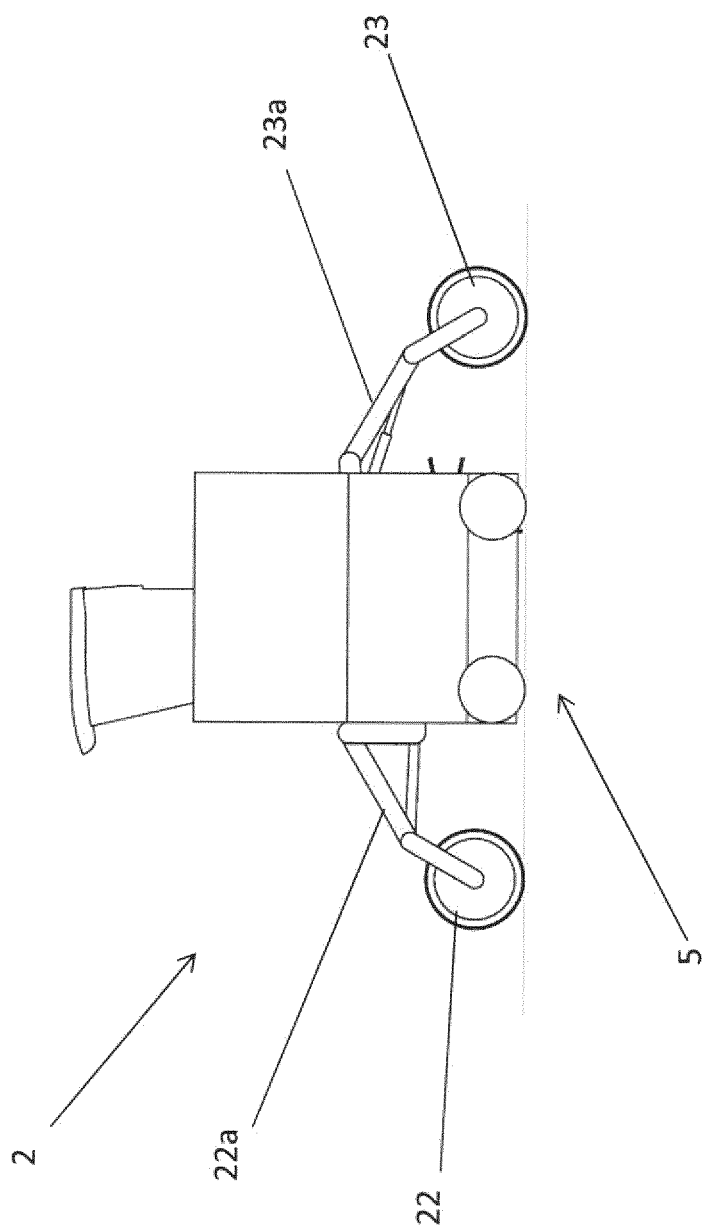
FIG. 8 shows a side view of the turner according to the invention in a membrane exchange position.

After the turning-over operation, a membrane 3 is unwound from the membrane-laying device, i.e. the associated winding shaft 23. Consequently, the winding shaft 23 is then empty, so that it must be reloaded for the next turning over operation. Therefore, as shown in FIG. 8, the turning-over device 2 can very easily provide for the corresponding winding shafts to be exchanged. For this purpose, the winding shafts 22, 23 can be moved from the working position to an exchange position. In the shown example, the winding shafts 22, 23 are attached to corresponding lever arms 22a or 23a, which can be lowered from the operating position to the exchange position via a mechanism that is not shown. In the position shown in FIG. 8, the winding shaft 22 would have a membrane wound onto it after the turning over operation, whereas the winding shaft 23 does not have a membrane. By lowering, the winding shaft 22 can now be attached to arm 23a and the winding shaft 23 to arm 22a. In this way, the membrane is "replaced".

Figure 9:
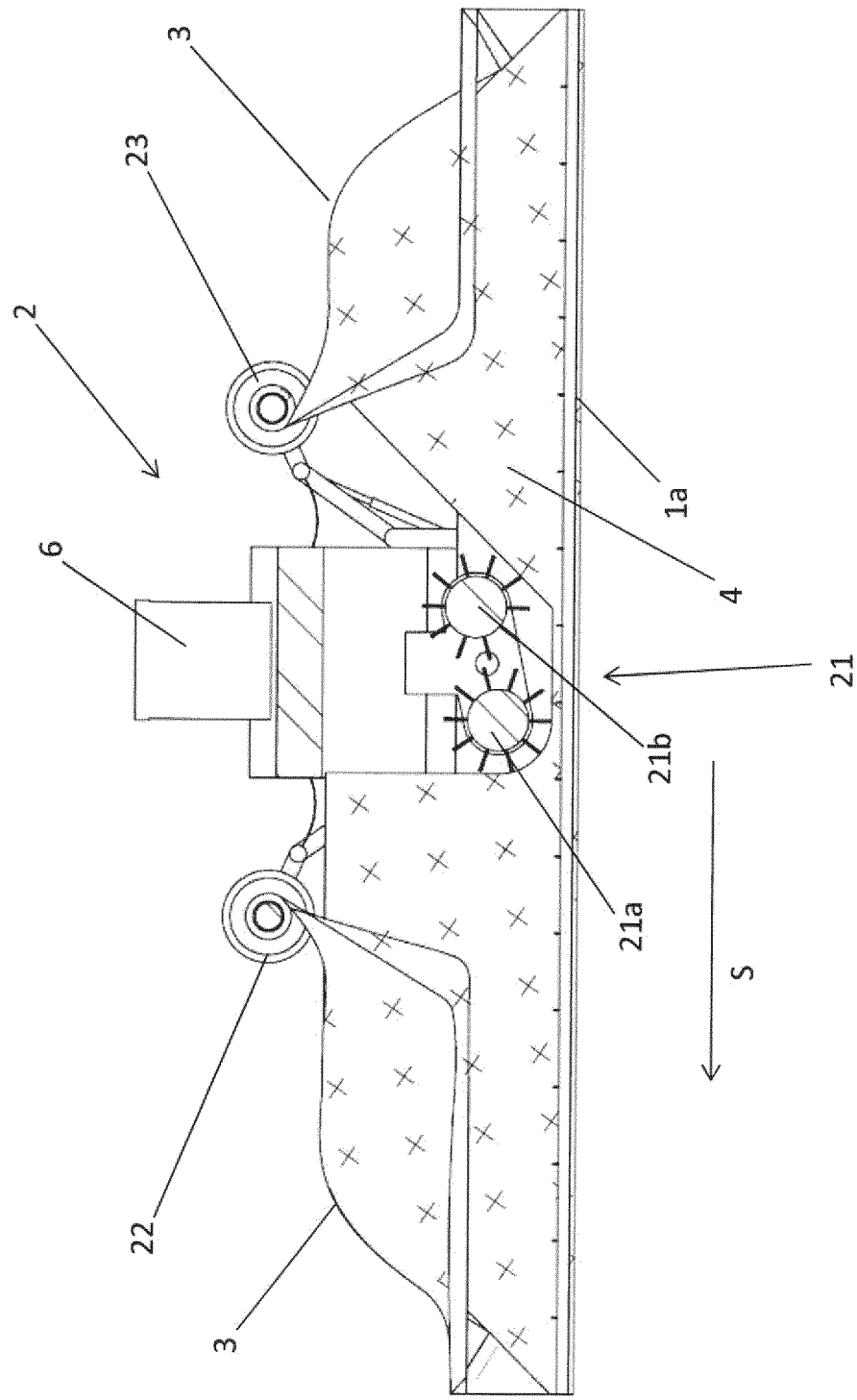
FIG. 9 shows a cross-section of the treatment unit shown in FIG. 3 with one turner in a further embodiment with two turning-over rollers.

The said approach is suitable for turning-over devices 2, which can only work in one direction. In an alternative embodiment based on FIG. 9, a bi-directional turning-over device is shown. In contrast to the turning-over device 2, which has already been explained, this one has two turning-over rollers 21a and 21b.

When turning over in direction S, the turning-over roller 21a is used, the turning-over roller 21b is lifted a little so that it does not come into contact with the bottom of treatment unit 1. Once the turning-over operation in direction S has been completed, another turning-over operation in the opposite direction can be carried out by lowering the turning-over roller 21b and raising the turning-over roller 21a. In this way, it is no longer necessary to replace the winding shafts (see FIG. 8). The raising and lowering of the turning-over rollers 21a and 21b can be solved constructively in different ways. Each roller can be mounted on its own suspension, which can be adjusted linearly upwards and downwards in a vertical direction. Alternatively, it is possible, for example, for both turning-over rollers 21a and 21b to be mounted on a rocker arm whose rotation about a swivel axis perpendicular to the drawing plane causes one turning-over roller to be raised and the other to be lowered.

What is claimed is:

1. An aerobic method for treating organic material comprising the steps of:
    a) loading a treatment unit (1) with organic material to be treated;
    b) covering the organic material to be treated with an odor emission-reducing first membrane that is selected from the group consisting of moisture-permeable membranes, air-permeable membranes, and membranes that are both moisture- and air-permeable;
    c) supplying air to the treatment unit (1), whereby aerobic treatment of the organic material is initiated by actively supplying the air to the organic material in the treatment unit (1) and flowing the air through the organic material in the treatment unit (1);
    d) turning over the organic material in the treatment unit (1) using a turning-over device (2), wherein the organic material in the treatment unit (1) is homogenized and/or mixed, wherein optionally the active supply of air to the organic material in the treatment unit (1) is interrupted and/or reduced during the turning over operation; and
    e) continuing the supply of air to the treatment unit (1) according to step c,
    wherein the turning-over device (2) comprises a turning-over roller (21), which is moved along the direction of a longitudinal extent (X) of the treatment unit (1) and thereby turns over the organic material in the treatment unit (1),
    wherein the turning-over device (2) further comprises a membrane holding apparatus (22), which holds the first membrane covering the organic material in the treatment unit (1) during the method,
    wherein the turning-over device (2) further comprises a membrane laying apparatus (23), which lays an odor emission-reducing second membrane on the turned-over organic material in the treatment unit (1), the second membrane also being selected from the group consisting of moisture-permeable membranes, air-permeable membranes, and membranes that are both moisture- and air-permeable,
    wherein the first membrane is wound up during the turning over by the membrane holding apparatus (22) arranged on the side advancing in the direction of movement (S) on the turning-over device (2), and
    wherein the second membrane is unwound during the turning over by the membrane laying apparatus (23) arranged on the side following in the direction of movement (S) on the turning-over device (2) by the membrane laying device (2).

2. The method according to claim 1,
    wherein the organic material in the treatment unit (1) is treated by a process selected from the group consisting of aerobic drying, aerobic composting, hygienization, aerobicization, microbiological conversion of pollutants, microbiological degradation of pollutants, and combinations thereof.

3. The method according to claim 1,
    wherein also during step b) a turning over of the organic material in the treatment unit (1) is carried out by means of the turning-over device (2).

4. The method according to claim 3,
    further comprising lifting the first membrane from the organic material during advancement of the turning-over device (2) during the turning operation.

5. The method according to claim 1,
    wherein the organic material in the treatment unit (1) is treated by a process selected from the group consisting of aerobic drying, aerobic composting, hygienization, aerobicization, microbiological conversion of pollutants, microbiological degradation of pollutants, and combinations thereof, and
    wherein also during step b) a turning over of the organic material in the treatment unit (1) is carried out by means of the turning-over device (2).

6. The method according to claim 5,
    further comprising lifting the first membrane from the organic material during advancement of the turning-over device (2) during the turning operation.

7. An aerobic method for treating organic material comprising the steps of:
    a) loading a treatment unit (1) with organic material to be treated;
    b) covering the organic material to be treated with an odor emission-reducing first membrane and holding the first membrane covering the organic material using a membrane holding apparatus (22) arranged on a side of the turning-over device (2) advancing in a direction of movement (S), wherein the turning-over device (2) comprises the membrane holding apparatus (22);
    c) supplying air to the treatment unit (1), whereby aerobic treatment of the organic material is initiated by actively supplying the air to the organic material in the treatment unit (1) and flowing the air through the organic material in the treatment unit (1);
    d) turning over the organic material in the treatment unit (1) using a turning-over device (2) comprising a turning-over roller (21) by moving the turning-over roller (21) through the treatment unit (1) along the direction of a longitudinal extent (X) of the treatment unit (1), wherein the organic material in the treatment unit (1) is homogenized and/or mixed, wherein optionally the active supply of air to the organic material in the treatment unit (1) is interrupted and/or reduced during the turning over operation;

e) laying an odor emission-reducing second membrane on the turned-over organic material in the treatment unit (1) using a membrane laying apparatus (23) arranged on a side of the turning-over device (2) following in the direction of movement (S), wherein the turning-over device (2) comprises the membrane laying apparatus (23);

f) winding up the first membrane during the turning over by the membrane holding apparatus (22);

g) unwinding the second membrane during the turning over by the membrane laying apparatus (23); and h) after completion of the aerobic treatment operation, further turning over the organic material in the treatment unit (1) by means of the turning-over device (2), in which the membrane lying on the organic material in the treatment unit (1) is held by the membrane holding apparatus (22), wherein the the first membrane and the second membrane each are selected from the group consisting of moisture-permeable membranes, air-permeable membranes, and membranes that are both moisture- and air-permeable.

8. The method according to claim 7, wherein the organic material in the treatment unit (1) is treated by a process selected from the group consisting of aerobic drying, aerobic composting, hygienization, aerobicization, microbiological conversion of pollutants, microbiological degradation of pollutants, and combinations thereof.

9. The method according to claim 7, wherein also during step b) a turning over of the organic material in the treatment unit (1) is carried out by means of the turning-over device (2).

10. The method according to claim 9, further comprising lifting the first membrane from the organic material during advancement of the turning-over device (2) during the turning operation.

11. The method according to claim 7, wherein the organic material in the treatment unit (1) is treated by a process selected from the group consisting of aerobic drying, aerobic composting, hygienization, aerobicization, microbiological conversion of pollutants, microbiological degradation of pollutants, and combinations thereof, and wherein also during step b) a turning over of the organic material in the treatment unit (1) is carried out by means of the turning-over device (2).

12. The method according to claim 11, further comprising lifting the first membrane from the organic material during advancement of the turning-over device (2) during the turning operation.

\* \* \* \* \*